United States Patent
Esteghlal

(10) Patent No.: US 12,113,355 B2
(45) Date of Patent: Oct. 8, 2024

(54) CONTROL DEVICE FOR A DC-DC CONVERTER, DC-DC CONVERTER, AND METHOD FOR CONTROLLING A DC-DC CONVERTER

(71) Applicant: Robert Bosch GmbH, Stuttgart (DE)

(72) Inventor: Gholamabas Esteghlal, Stuttgart-Weilimdorf (DE)

(73) Assignee: Robert Bosch GmbH, Stuttgart (DE)

( * ) Notice: Subject to any disclaimer, the term of this patent is extended or adjusted under 35 U.S.C. 154(b) by 166 days.

(21) Appl. No.: 17/639,130

(22) PCT Filed: Aug. 20, 2020

(86) PCT No.: PCT/EP2020/073282
§ 371 (c)(1),
(2) Date: Feb. 28, 2022

(87) PCT Pub. No.: WO2021/037648
PCT Pub. Date: Mar. 4, 2021

(65) Prior Publication Data
US 2022/0329066 A1    Oct. 13, 2022

(30) Foreign Application Priority Data
Aug. 30, 2019    (DE) .................... 10 2019 213 071.2

(51) Int. Cl.
*H02J 1/10*    (2006.01)
*H02M 3/158*    (2006.01)

(52) U.S. Cl.
CPC .............. *H02J 1/102* (2013.01); *H02J 1/106* (2020.01); *H02M 3/1584* (2013.01)

(58) Field of Classification Search
CPC .. H02J 1/10; H02J 1/102; H02J 1/106; H02M 3/137; H02M 3/139; H02M 3/156; H02M 3/157; H02M 3/158; H02M 3/1582; H02M 3/1584
See application file for complete search history.

(56) References Cited

U.S. PATENT DOCUMENTS

| | | | |
|---|---|---|---|
| 6,009,000 A | 12/1999 | Siri | |
| 10,474,179 B2* | 11/2019 | Guo | ........................ H04L 12/10 |
| 2003/0185025 A1* | 10/2003 | Takemura | ........... H02M 3/1584 363/65 |
| 2006/0139974 A1* | 6/2006 | Dermark | ................. H02J 1/102 363/65 |
| 2006/0273770 A1* | 12/2006 | Siri | ................... H02M 3/33515 323/272 |

(Continued)

FOREIGN PATENT DOCUMENTS

DE    102016219740 A1    4/2018

OTHER PUBLICATIONS

Translation of International Search Report for Application No. PCT/EP2020/073282 dated Nov. 17, 2020 (2 pages).

*Primary Examiner* — Levi Gannon
(74) *Attorney, Agent, or Firm* — Michael Best & Friedrich LLP

(57) ABSTRACT

The invention relates to a control device (100) for a DC-DC converter (110) having multiple parallel-connected DC-DC converter modules (120_1, . . . , 120_n). The control device measures individual target current values for the DC-DC converter modules so that these are operated with a common degree of utilisation.

9 Claims, 2 Drawing Sheets

(56) References Cited

U.S. PATENT DOCUMENTS

| | | | | |
|---|---|---|---|---|
| 2009/0289502 A1* | 11/2009 | Batarseh | ............... | H02J 1/102 |
| | | | | 307/43 |
| 2012/0043923 A1* | 2/2012 | Ikriannikov | .......... | H02J 7/0014 |
| | | | | 307/82 |
| 2015/0076911 A1* | 3/2015 | Pape | .................. | H02J 3/381 |
| | | | | 307/52 |
| 2019/0058409 A1* | 2/2019 | Ishibashi | ............... | H02M 1/14 |
| 2019/0157979 A1* | 5/2019 | Higaki | ................. | H02M 3/28 |

* cited by examiner

CONTROL DEVICE FOR A DC-DC CONVERTER, DC-DC CONVERTER, AND METHOD FOR CONTROLLING A DC-DC CONVERTER

FIELD

The present invention relates to a control device for a DC-DC converter and to a DC-DC converter comprising a control device of this kind. The present invention furthermore relates to a method for controlling a DC-DC converter. In particular, the present invention relates to controlling a DC-DC converter comprising a plurality of DC-DC transducer modules.

BACKGROUND OF THE INVENTION

Document DE 10 2016 219 740 A1 discloses a DC-DC converter comprising a plurality of DC-DC transducer modules connected in parallel. In this case, a common voltage controller is provided for all of the DC-DC transducer modules. Furthermore, a separate current control system is provided for each DC-DC transducer module.

DC-DC converters are provided to convert a DC input voltage to a DC output voltage, wherein the voltage level of the DC input voltage may be different to the voltage level of the DC output voltage. The maximum output power or maximum power of a DC-DC converter is limited in accordance with the dimensioning of the components used. In order to increase the output power, a plurality of DC-DC transducer modules can be connected in parallel within a DC-DC converter as appropriate. During the operation of parallel-connected DC-DC transducers, the respective degree of loading or degree of utilization is usually of a different magnitude, even given identical output currents and, on account of the parallel connection, an output voltage of the same size, since the parallel-connected DC-DC transducers have maximum powers of different magnitudes. The degree of utilization of a single DC-DC transducer should be considered here as the ratio between the current power of the DC-DC transducer and the maximum power thereof. The reason for the maximum powers of different magnitudes may be the use of DC-DC transducers of different power classes, for example 1200 W or 1800 W. However, individual DC-DC transducers of one power class can also even have maximum powers that greatly deviate from one another, for example by approximately 5% and more, on account of component tolerances. Given a parallel connection of these DC-DC transducers and a parallel operation with either identical currents or identical power, a DC-DC transducer with a lower maximum power would have a higher degree of utilization compared to a DC-DC transducer with a greater maximum power. Individual components and component parts of a DC-DC transducer are loaded to a greater extent in the case of operation at a high degree of utilization than in the case of operation at a lower degree of utilization. Components and component parts that are loaded to a greater extent age to a greater extent, consequently fail earlier and lead to earlier failure of the DC-DC transducer than in the case of operation at a lower degree of utilization. Therefore, in a DC-DC converter comprising a plurality of parallel-connected DC-DC transducers, there is the need to operate the individual DC-DC transducers with a degree of utilization that is as identical as possible in order to maximize the total service life of the DC-DC converter.

SUMMARY OF THE INVENTION

The present invention discloses a control device for a DC-DC converter, to a DC-DC converter and to a method for controlling a DC-DC converter.

Accordingly, the following is provided:

A control device for a DC-DC converter comprising a plurality of DC-DC transducer modules connected in parallel on the output side. The DC-DC converter comprises a first ascertaining unit for ascertaining an, in particular current, total degree of utilization of the DC-DC converter depending on the output currents, the output voltage of the DC-DC transducer modules and/or the maximum powers thereof, or depending on variables representing these variables. The DC-DC transducer furthermore comprises utilization ascertaining units, wherein each DC-DC transducer module is assigned a utilization ascertaining unit, for ascertaining the, in particular current, degree of utilization of the assigned DC-DC transducer module depending on the output current, the output voltage of the assigned DC-DC transducer module and/or the maximum power thereof, or depending on variables representing these variables. The DC-DC transducer furthermore comprises a plurality of utilization equalizing controllers, wherein each DC-DC transducer module is assigned a utilization equalizing controller, and the utilization equalizing controllers are each configured to generate a setpoint current value for the respectively assigned DC-DC transducer module based on the ascertained total degree of utilization as setpoint value and the current degree of utilization as actual value and in particular to provide said setpoint current value to a current controller of the respectively assigned DC-DC transducer module.

A control device is provided for the purpose of controlling the operation of a plurality of DC-DC transducer modules whose output connections are connected in parallel. The DC voltage modules together form a DC-DC converter. The same voltage is applied to all of the DC voltage modules on account of the parallel connection of the output connections. The control device comprises a first ascertaining unit, which ascertains a total degree of utilization of the DC-DC converter. The total degree of utilization is formed from the quotient of the current power of the DC-DC converter and the maximum power of the DC-DC converter. To this end, the current powers of the individual DC voltage modules are counted together, wherein a power of a DC-DC transducer results for example from the product of the output current and the output voltage of the DC-DC transducer module. Given a constant output voltage, a measure for the current power of the DC-DC converter can therefore be ascertained only using a detected output current. The maximum power of the DC-DC converter results from the sum of the maximum powers of the individual DC-DC transducer modules and is predefined, in particular, as a calibration value. In particular, the maximum power of the DC-DC transducer modules is assumed to be constant for the control device. The sum thereof also results in a constant maximum power of the DC-DC converter. On account of the common output voltage, only the determination of the ratio between the current output current (as sum of the output currents of the individual DC-DC transducer modules) and the maximum output current of the DC-DC converter is sufficient to determine the total degree of utilization of the DC-DC converter, wherein the maximum output current of the DC-DC converter results from the sum of the maximum output currents of the individual DC-DC transducers. It is sufficiently known that both the output voltage and the output current of a DC-DC transducer module or of the converter can also be determined for example from variables measured at the input of the DC-DC transducer module or other correlating values can be ascertained, even by means of model formation. Therefore, the total degree of utilization of the DC-DC converter can also be ascertained depending on variables that represent the output currents, the output voltage or the maximum power.

The control device furthermore comprises a plurality of utilization ascertaining units. Each DC-DC transducer module is assigned a utilization ascertaining unit. This multiplicity and assignment are to be understood as purely exemplary in the context of control technology. Utilization ascertaining units of this kind may preferably be embodied using software or hardware by means of only one or a plurality of component parts. It is possible that all of the ascertaining units mentioned in the disclosure are formed only as software. Analogously to above, a degree of utilization of the assigned DC-DC transducer module is ascertained as the quotient of the current power and the maximum power of the DC-DC transducer module. The above statements with respect to ascertaining the electrical parameters also apply, with the result that the degree of utilization of a DC-DC transducer module can also be ascertained depending on variables that represent the output current, the output voltage or the maximum power of the DC-DC transducer module.

The control device furthermore comprises a plurality of utilization equalizing controllers, wherein likewise each utilization equalizing controller is assigned a DC-DC transducer module. Utilization equalizing controllers of this kind may preferably be embodied using software or hardware by means of only one or a plurality of component parts. It is possible that all of the utilization equalizing controllers mentioned in the disclosure are formed only as software. The utilization equalizing controllers output a setpoint current value as specification for the respectively assigned DC-DC transducer module, wherein the ascertained total degree of utilization is supplied to the utilization equalizing controller as setpoint value and the ascertained degree of utilization is supplied as actual value. The current setpoint value can be supplied to a current controller upstream of the DC-DC transducer module. The result is thus a cascade structure of the current controller and the utilization equalizing controller. As an alternative, the current setpoint value can be supplied directly to a DC-DC transducer module.

Provision is advantageously made of a control device that makes it possible to automatically adjust the utilization of the individual DC-DC transducer modules to the total utilization of the DC-DC converter. The different parallel-connected DC-DC transducer modules are thus loaded uniformly during operation of the DC-DC converter. This leads to an extension of the service life of the DC-DC converter, since a singular loading of an individual DC-DC transducer module to a greater extent is prevented.

In another configuration of the invention, a utilization equalizing controller is activated depending on the difference between the total degree of utilization and the degree of utilization of the assigned DC-DC transducer module. In particular, the utilization equalizing controller is activated when the difference between the total degree of utilization and the degree of utilization of the assigned DC-DC transducer module is greater than a first predefinable difference value.

The utilization equalizing controller is activated only when a deviation between the total degree of utilization and the degree of utilization of the assigned DC-DC transducer module exceeds a predefinable difference value. By way of example, the difference value may be a percentage of, for instance, 10% or an absolute value.

Advantageously, computation resources are not used or controller losses are prevented provided there is no relevant deviation between the total degree of utilization and the degree of utilization.

In another configuration of the invention, a utilization equalizing controller is deactivated or switched off when one of the DC-DC transducer modules exceeds the maximum current thereof owing to the operation of the utilization equalizing controller.

Overloading of an individual DC-DC transducer module is advantageously prevented, in particular in the case of dynamic shifts in the load point.

In another configuration of the invention, a utilization equalizing controller is activated or deactivated depending on a change in the operating point of the DC-DC converter. The utilization equalizing controller is activated, in particular, when the operating point is stable, in particular when the operating point is constant for longer than a first predefinable period. The utilization equalizing controller is deactivated, in particular, when the operating point is unstable, in particular the operating point is constant for less than a second predefinable period.

An operating point may be described, for example, as an operating point at a particular output current and a particular output voltage. Given a stable operating point, these parameters do not vary or hardly vary. By way of example, an operating point is stable when the parameters deviate from their original value by less than +/−5 percent over a first predefinable period, preferably one minute. By way of example, an operating point is unstable when the parameters deviate from their original value by more than +/−5 percent over a second predefinable period, preferably one minute. The permissible deviations and the first and second predefinable periods can be adjusted to the operating conditions. By way of example, the start-up of a system, for example a vehicle system, constitutes an unstable operating point. The utilization equalizing controller would preferably be deactivated at this time. It is thus not possible for overloading of individual DC-DC transducer modules to occur on account of balancing currents in the DC-DC converter.

A criterion that enables the expedient use of the control device and prevents the overloading of individual DC voltage modules is advantageously provided.

The invention also relates to a DC-DC converter comprising a plurality of DC-DC transducer modules, which are configured to convert a DC input voltage to a DC output voltage, wherein the DC-DC converter comprises a control device described above.

A DC-DC converter comprising a control device that makes it possible to utilize the DC voltage modules uniformly is advantageously provided.

The invention also relates to a method for controlling a DC-DC converter comprising a plurality of DC-DC transducer modules, comprising the steps of: ascertaining a total degree of utilization of the DC-DC converter depending on the output currents, the output voltage of the DC-DC transducer modules and/or the maximum powers thereof, or depending on variables representing these variables; ascertaining the degree of utilization of a DC-DC transducer module depending on the output current, the output voltage of the DC-DC transducer module and/or the maximum power thereof, or depending on variables representing these variables; generating a setpoint current value for a DC-DC transducer module based on the ascertained total degree of utilization as setpoint value and the degree of utilization as actual value.

Provision is advantageously made of a method that makes it possible to automatically adjust the utilization of individual DC-DC transducer modules to the total utilization of a DC-DC converter. The different parallel-connected DC-DC transducer modules are thus loaded uniformly during operation of the DC-DC converter. This leads to an extension of the service life, since a loading of an individual DC-DC transducer module to a greater extent is prevented.

The invention also relates to a computer program, which is set up to execute the described method.

The invention also relates to a machine-readable storage medium, on which the described computer program is stored.

The above configurations and developments can be combined with one another as desired, insofar as is sensible. Further configurations, developments and implementations of the invention also include combinations, which have not been explicitly mentioned, of features of the invention described above or below in relation to the exemplary embodiments. In particular, a person skilled in the art will in this case also add individual aspects as improvements or additions to the respective basic forms of the invention.

BRIEF DESCRIPTION OF THE DRAWINGS

Further features and advantages of the invention are explained below with reference to the figures, in which.

DETAILED DESCRIPTION

Figure 1:
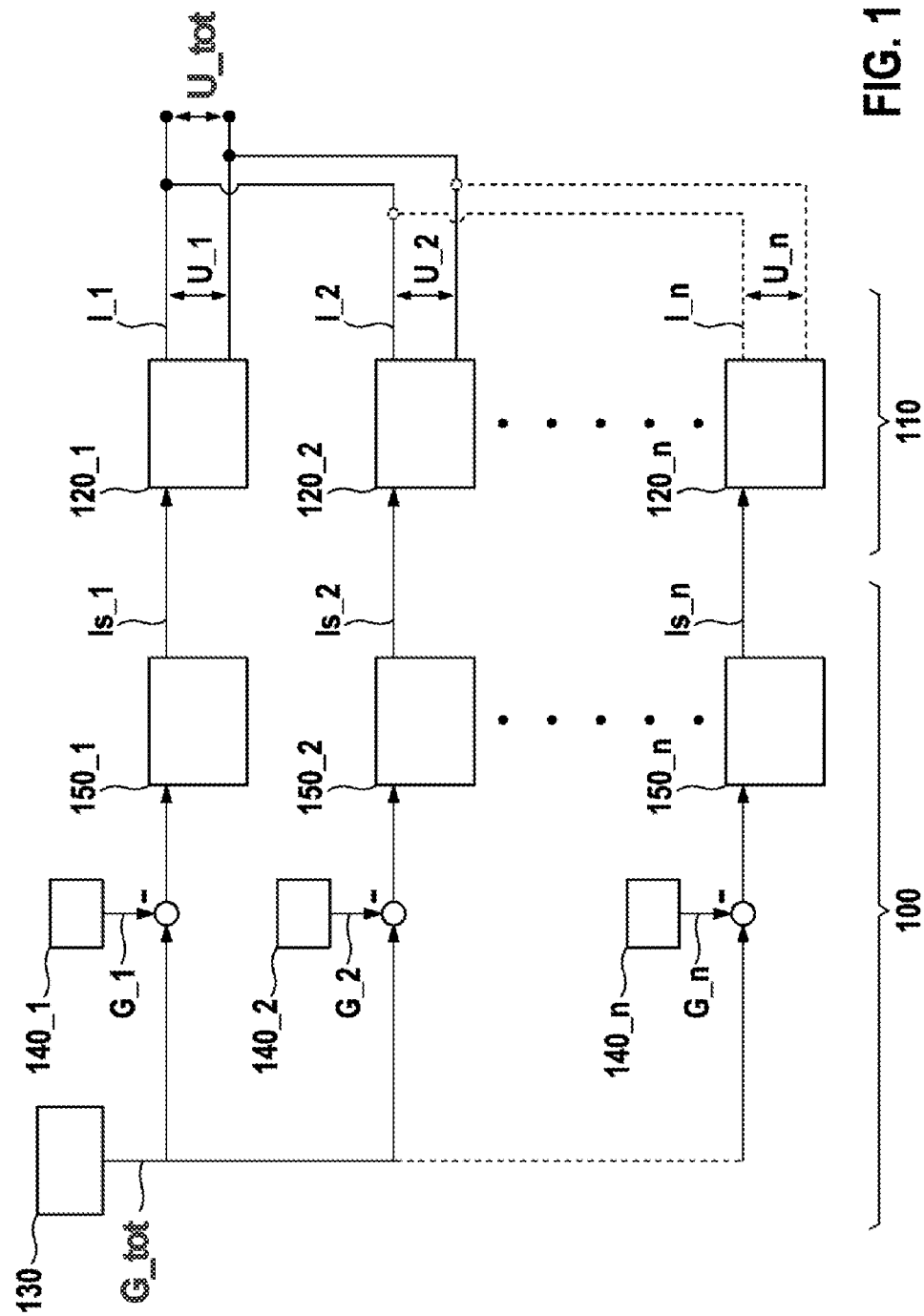
FIG. 1: shows a schematic illustration of a DC-DC converter comprising a control device in accordance with one embodiment.

FIG. 1 shows a schematic illustration of a DC-DC converter 110 in accordance with one embodiment. The DC-DC converter 110 comprises a plurality of DC-DC transducer modules 120_i. In particular, all of the DC-DC transducer modules 120_i are fed in parallel on the input side with an input voltage U_i (not shown in the drawing for reasons of clarity). The DC-DC transducer modules 120_i are likewise connected in parallel on the output side and supply an output voltage U_i corresponding to the output voltage of the DC-DC converter 110 U_tot. The DC-DC transducer modules 120_i may be what are known as DC/DC transducers, which convert a DC input voltage to a DC output voltage. The DC-DC transducer modules 120_i may be both DC-DC transducer modules that convert a DC voltage supplied on the input side to a higher output voltage and/or convert a DC voltage supplied on the input side to a DC voltage that is lower than the DC voltage supplied on the input side.

The parallel-connected DC-DC transducer modules 120_i may be a plurality of identical or similar DC-DC transducer modules. Furthermore, it is also possible, however, for some or, if appropriate, also all of the parallel-connected DC-DC transducer modules 120_i to have a different structure. In particular, it is also possible to connect DC-DC transducer modules 120_i with different maximum powers in parallel. Even in the case of similar DC-DC transducers, the maximum powers may deviate from one another on account of component tolerances.

FIG. 1 also shows a control device 100, which comprises a first ascertaining unit 130 for ascertaining a total degree of utilization G_tot of the DC-DC converter 110 depending on the output currents I_i, the output voltage U_i of the DC-DC transducer modules 120_i and/or the maximum powers P_i thereof, or depending on variables representing these variables. The control device 100 also comprises a plurality of utilization ascertaining units 140_i, wherein each DC-DC transducer module 120_i is assigned a utilization ascertaining unit 140_i for ascertaining the degree of utilization G_i of the assigned DC-DC transducer module 120_i depending on the output current I_i, the output voltage U_i of the assigned DC-DC transducer module 120_i and/or the maximum power P_i thereof, or depending on variables representing these variables. The control device 100 also comprises a plurality of utilization equalizing controllers 150_i, wherein each DC-DC transducer module 120_i is assigned a utilization equalizing controller 150_i, and the utilization equalizing controllers 150_i are each configured to generate a setpoint current value Is_i for the respectively assigned DC-DC transducer module 120_i based on the ascertained total degree of utilization G_tot as setpoint value and the degree of utilization G_i as actual value.

Figure 2:
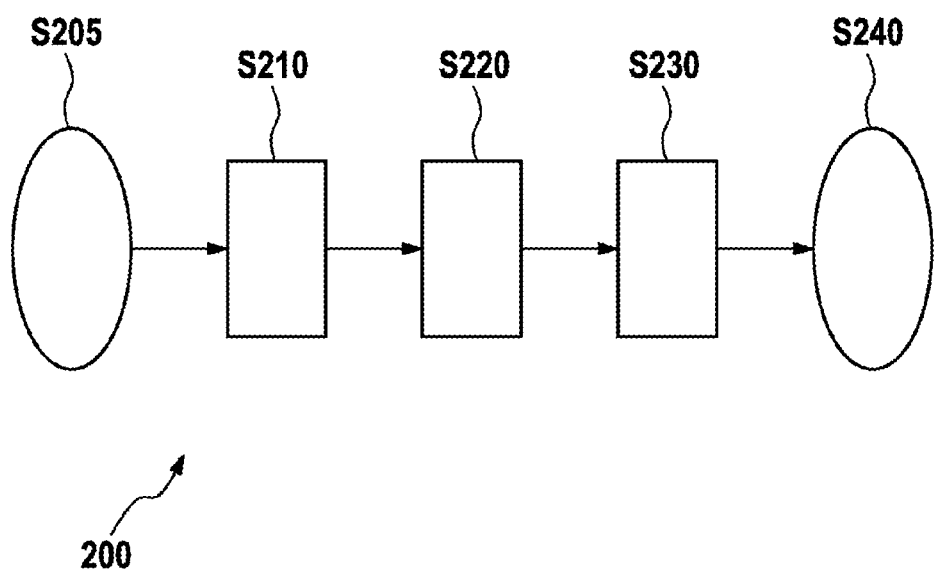
FIG. 2: shows a schematic illustration of a flowchart for a method for controlling a DC-DC converter, such as forms a basis of one embodiment.

FIG. 2 shows a schematic illustration of a flowchart, such as forms a basis of a method 200 for controlling a DC-DC converter 110 comprising a plurality of DC-DC transducer modules 120_i. The method starts in step S205. In step S210, a total degree of utilization G_tot of the DC-DC converter 110 is ascertained. In step S220, a degree of utilization G_i of a DC-DC transducer module 120_i is ascertained. In step S230, a setpoint current value Is_i for a DC-DC transducer module 120_i is generated. The method ends with step S240.

The invention claimed is:

1. A control device (100) for a DC-DC converter (110) comprising a plurality of DC-DC transducer modules (120_i), with different maximum output powers, connected in parallel on an output side, the control device (100) comprising:

a first ascertaining unit (130) for ascertaining a total degree of utilization (G_tot) of the DC-DC converter (110) based on output currents (I_i) of the DC-DC transducer modules (120_i), output voltage (U_i) of the DC-DC transducer modules (120_i), and respective maximum powers (P_i) of each of the DC-DC transducer modules (120_i), wherein the respective maximum powers (P_i) of each of the DC-DC transducer modules (120_i) are a maximum output power the DC-DC transducer modules (120_i) are capable of outputting, a plurality of utilization ascertaining units (140_i), wherein each DC-DC transducer module (120_i) is assigned a utilization ascertaining unit (140_i), for ascertaining the degree of utilization (G_i) of the assigned DC-DC transducer module (120_i) based on the respective maximum power (P_i) of the assigned DC-DC transducer module (120_i) and at least one selected from a group consisting of the output current (I_i) of the assigned DC-DC transducer module (120_i) and the output voltage (U_i) of the assigned DC-DC transducer module (120_i), a plurality of utilization equalizing controllers (150_i), wherein each DC-DC transducer module (120_i) is assigned a utilization equalizing controller (150_i), and the utilization equalizing controllers (150_i) are each configured to generate a setpoint current value (Is_i) for the respectively assigned DC-DC transducer module (120_i) based on the ascertained total degree of utilization (G_tot) as setpoint value and the degree of utilization (G_i) as actual value.

2. The control device as claimed in claim 1, wherein a utilization equalizing controller (150_i) is activated based on a difference between the total degree of utilization (G_tot) and the degree of utilization (G_i) of the assigned DC-DC transducer module (120_i), wherein the utilization equalizing controller (150_i) is activated when the difference between the total degree of utilization (G_tot) and the degree of utilization (G_i) of the assigned DC-DC transducer module (120_i) is greater than a first predefinable difference value.

3. The control device as claimed in claim 1, wherein a utilization equalizing controller (150_i) is deactivated when one of the DC-DC transducer modules (120_i) exceeds a maximum current of the DC-DC transducer modules (120_i) owing to operation of the utilization equalizing controller (150_i).

4. The control device as claimed in claim 1 wherein a utilization equalizing controller (150_i) is activated or deactivated depending on a change in an operating point of the DC-DC converter (110),
wherein the utilization equalizing controller (150_i) is activated when the operating point is constant for longer than a first predefinable period, and the utilization equalizing controller (150_i) is deactivated when the operating point is constant for less than a second predefinable period.

5. A DC-DC converter (110), comprising:
a plurality of DC-DC transducer modules (120_i), which are configured to convert a DC input voltage to a DC output voltage (U_i), wherein the DC-DC converter (110) comprises a control device (100) as claimed in claim 1.

6. The control device as claimed in claim 1, wherein the degree of utilization of the assigned DC-DC transducer module (120_i) is based on a quotient of output power of the assigned DC-DC transducer module (120_i) and the respective maximum power (P_i) of the assigned DC-DC transducer module (120_i).

7. The control device as claimed in claim 1, wherein a difference in magnitude of the respective maximum powers (P_i) of each of the DC-DC transducer modules (120_i) is based on component tolerances of each of the DC-DC transducer modules (120_i).

8. A method for controlling a DC-DC converter (110) comprising a plurality of DC-DC transducer modules (120_i) with different maximum output powers, the method comprising the steps of:

ascertaining (S210) a total degree of utilization (G_tot) of the DC-DC converter (110) based on output currents (I_i) of the DC-DC transducer modules (120_i), output voltage (U_i) of the DC-DC transducer modules (120_i), and respective maximum powers (P_i) of each of the DC-DC transducer modules (120_i), wherein the respective maximum powers (P_i) of each of the DC-DC transducer modules (120_i) are a maximum output power the DC-DC transducer modules (120_i) are capable of outputting, ascertaining (S220) a degree of utilization (G_i) of a DC-DC transducer module (120_i) based on the respective maximum power (P_i) of the DC-DC transducer module (120_i) and at least one selected from a group consisting of the output current (I_i) of the DC-DC transducer module (120_i) and the output voltage (U_i) of the DC-DC transducer module (120_i), generating (S230) a setpoint current value (Is_i) for the DC-DC transducer module (120_i) based on the ascertained total degree of utilization (G_tot) as setpoint value and the degree of utilization (G_i) as actual value.

9. A computer program product comprising program instructions stored on a machine-readable storage medium, wherein when the program instructions are executed by a computer processor, the program instructions cause the computer processor to execute the method as claimed in claim 8.

* * * * *